United States Patent
Choi et al.

(10) Patent No.: US 7,812,809 B2
(45) Date of Patent: Oct. 12, 2010

(54) DISPLAY DEVICE AND A METHOD THEREOF

(75) Inventors: Jae-young Choi, Yongin-si (KR); Jee-hwan Jang, Yongin-si (KR); Byung-do Oh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 827 days.

(21) Appl. No.: 11/674,177

(22) Filed: Feb. 13, 2007

(65) Prior Publication Data

US 2007/0188676 A1    Aug. 16, 2007

(30) Foreign Application Priority Data

Feb. 13, 2006  (KR) .............. 10-2006-0013700
Oct. 17, 2006  (KR) .............. 10-2006-0101045

(51) Int. Cl.
*G09G 3/36*    (2006.01)

(52) U.S. Cl. .............. 345/102; 345/88; 345/89; 345/108; 345/109

(58) Field of Classification Search .......... 345/87–111, 345/204–215, 690
See application file for complete search history.

(56) References Cited

U.S. PATENT DOCUMENTS

| | | | | |
|---|---|---|---|---|
| 7,180,677 B2 * | 2/2007 | Fujii et al. | .............. | 359/665 |
| 2004/0196525 A1 * | 10/2004 | Fujii et al. | .............. | 359/245 |
| 2006/0061530 A1 * | 3/2006 | Yuasa | .............. | 345/88 |

OTHER PUBLICATIONS

High-transmission electrowetting light valves; J. Heikenfeld, A. J. Steckl; Applied Physics Letters 86, 151121 (2005).

* cited by examiner

*Primary Examiner*—Vijay Shankar
(74) *Attorney, Agent, or Firm*—Cantor Colburn LLP

(57) ABSTRACT

The display device includes a backlight unit including a field sequential light source operated using a sequential partition method and an optical shutter using an electrowetting phenomenon disposed on a light emitting surface of the backlight unit and switching light outputted from the backlight unit.

26 Claims, 14 Drawing Sheets

4ms

4ms

4ms

4ms

DISPLAY DEVICE AND A METHOD THEREOF

This application claims priority to Korean Patent Application Nos. 10-2006-0013700, filed on Feb. 13, 2006, and 10-2006-0101045, filed on Oct. 17, 2006, and all the benefits accruing therefrom under 35 U.S.C. §119, the contents of which are incorporated herein in its entirety by reference.

BACKGROUND OF THE INVENTION

1. Field of the Invention

The present invention relates to a display device, and more particularly, to a new display device including a backlight unit in which a field sequential light source operated by a sequential partition method is included, and including an optical shutter operated using an electrowetting phenomenon.

2. Description of the Related Art

In order to display television ("TV") pictures and computer information, cathode ray tube ("CRT") monitors have been used. However, due to recent demand for larger and slimmer screens, flat panel displays such as Liquid Crystal Displays ("LCDs"), Plasma Display Panels ("PDPs"), and Field Emission Displays ("FEDs") are now being used. In particular, LCDs are being widely used as TVs and computer monitors due to low power consumption.

Conventional LCDs modulate white light generated by a backlight unit using a liquid crystal layer. The modulated white light passes through red ("R"), green ("G"), and blue ("B") filters, thereby realizing images. However, manufacturing such color filters of conventional LCDs is time consuming and expensive. In addition, each color filter filters a fixed color and thus only one-third (⅓) of the white light passing through the liquid crystal layer is used, thereby increasing light loss.

A LCD using a field sequential Light Emitting Diode ("LED") operated by a sequential partition method as a backlight unit to realize images using an afterimage effect, has recently been developed. In such an LCD, red ("R"), green ("G"), and blue ("B") light is sequentially outputted from the field sequential LED and such colored light passes through the liquid crystal layer, thereby realizing an image. Since an LCD using field sequential LEDs does not need color filters, light loss is decreased and time and cost required to manufacture the LCD are reduced. However, similarly to conventional LCDs using color filters, an LCD using field sequential LEDs uses a polarizer, and thus, brightness is hardly improved. In addition, when sixty (60) frames are expected to be realized in one second, and considering that one frame is formed of four sub-frames (e.g., R/G/B/Black) operated sequentially, each sub-frame should be operated at a speed of about 240 Hz. Accordingly, a liquid crystal response speed of approximately 4 millisecond (ms) is required. In addition, when one frame is formed of six sub-frames (e.g., R/Black/G/Black/B/Black) each sub-frame should be operated at a speed of about 360 Hz. Accordingly, a liquid crystal response speed of approximately 3 ms is required. However, as a liquid crystal response speed is currently approximately 25 ms, realizing images using such LCDs is difficult.

BRIEF SUMMARY OF THE INVENTION

An exemplary embodiment provides a display device including a backlight unit in which a field sequential light source operated by a sequential partition method is included, and an optical shutter operated using an electrowetting phenomenon.

In an exemplary embodiment, there is provided a display device including a backlight unit including a field sequential light source operated using a sequential partition method and an optical shutter using an electrowetting phenomenon. The optical shutter is disposed on a light emitting surface of the backlight unit and switches light outputted from the backlight unit.

In an exemplary embodiment, the optical shutter may include first and second substrates spaced apart from each other at a predetermined interval and disposed facing each other, a plurality of first electrodes disposed on an inner surface of the first substrate, an insulator disposed on the first substrate and covering the first electrodes, a plurality of second electrodes disposed on an inner surface of the second substrate, a plurality of pixels disposed at intersections of the first electrodes and the second electrodes, and a transparent aqueous solution and an opaque organic solution disposed between the second electrodes and the insulator.

In an exemplary embodiment, the optical shutter may switch light of a predetermined color outputted from the backlight unit for each pixel and the organic solution is moved when a fixed voltage is applied between the first electrodes and the second electrodes.

In an exemplary embodiment, the voltage applied between the first electrodes and the second electrodes may be controlled so as to control a grey scale of each pixel.

In an exemplary embodiment, the plurality of first electrodes may be formed to correspond to one pixel and a switching voltage to each of the first electrodes may be controlled so as to control a gray scale of each pixel.

In an exemplary embodiment, the display device may further include a plurality of partition walls interposed between the first substrate and the second substrate. The partition walls partition a space between the first substrate and the second substrate to form pixels. A lower part of the partition walls may be thinner than an upper part of the partition walls and the organic solution moves into the lower part of the partition walls.

In an exemplary embodiment, the first and second substrates may be transparent substrates. The first electrodes may be parallel to each other. The second electrodes may be parallel to each other and intersect with the first electrodes In an exemplary embodiment, the first and second electrodes may include transparent conductive materials such as Indium Tin Oxide (ITO) or zinc oxide (ZnO).

In an exemplary embodiment, the insulator may include a hydrophobic surface. The organic solution may move at a speed of 0.1 to 5 centimeters per second (cm/sec) when a voltage is applied between the first and second electrodes.

In an exemplary embodiment, the field sequential light source may output red ("R")/green ("G")/blue ("B")/black lights sequentially per one frame or red ("R")/black/green ("G")/black/blue ("B")/black lights sequentially per one frame.

An exemplary embodiment provides a method of controlling a display device. The method includes operating an optical shutter using an electrowetting phenomenon and switching light of a predetermined color outputted from the backlight unit for each of a plurality of pixels. The optical shutter is disposed on a light emitting side of a backlight unit. The optical shutter includes a first and a second substrate spaced apart from each other at a predetermined interval and disposed facing each other, a plurality of first electrodes disposed on an inner surface of the first substrate, an insulator disposed on the first substrate and covering the first electrodes, a plurality of second electrodes disposed on an inner surface of the second substrate, the plurality of pixels disposed at intersections of the first electrodes and the second electrodes and a transparent aqueous solution and an opaque organic solution disposed between the second electrodes and the insulator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
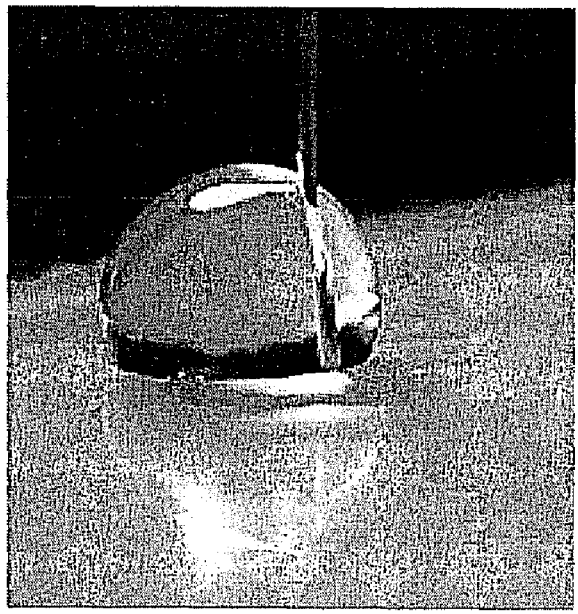
FIGS. 1A and 1B are photographic images of water drops placed on a hydrophobic solid surface when voltage is not applied and voltage is applied, respectively.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" or "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

An optical shutter operated using an electrowetting phenomenon is used in the present invention in order to switch light (e.g., allow or restrict transmittance) of a predetermined color outputted from a backlight unit. Hereinafter, the electrowetting phenomenon will be described first and then an exemplary embodiment of a display device using the electrowetting phenomenon according to the present invention will be described.

The electrowetting phenomenon occurs because an electrowetting property of a solid is changed when voltage is applied.

Figure 1B:
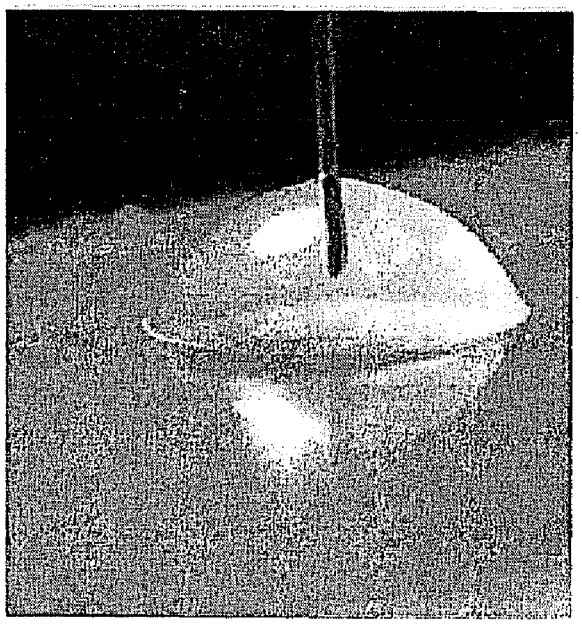

FIGS. 1A and 1B are photographic images of water drops placed on a hydrophobic solid surface when voltage is not applied and voltage is applied, respectively. Referring to FIG. 1A, when a water drop is placed on a hydrophobic solid surface, the hydrophilic water drop has relatively poor contact with the hydrophobic solid surface, thereby showing a high contact angle. However, when voltage is applied to the hydrophobic solid, the surface of the solid exhibits hydrophilic property as illustrated in FIG. 1B and thus the electrowetting phenomenon occurs.

Such phenomenon is expressed by a Lippman equation (Equation 1) as below.

$$\gamma_{LV}\cos\theta = \gamma_{SV} - \gamma_{SL} + \frac{1}{2}\frac{\varepsilon_0 \varepsilon_r}{d}V^2 \quad \text{[Equation 1]}$$

Referring to Equation 1, a contact angle (θ) of a liquid placed on a solid is affected by the interface energy of a liquid and a vapor ($\gamma_{LV}$), the interface energy of a solid and a vapor ($\gamma_{SV}$), the interface energy of a solid and a liquid ($\gamma_{SL}$), applied voltage (V), a dielectric constant of a solid ($\varepsilon_r$), and the thickness of a solid (d).

Figure 2A:
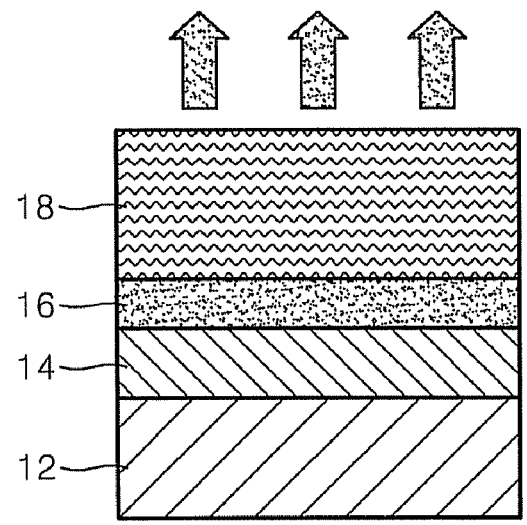
FIGS. 2A and 2B are cross-sectional diagrams of an exemplary embodiment of an optical shutter operated using an electrowetting phenomenon when voltage is not applied and voltage is applied, respectively.
Figure 2B:
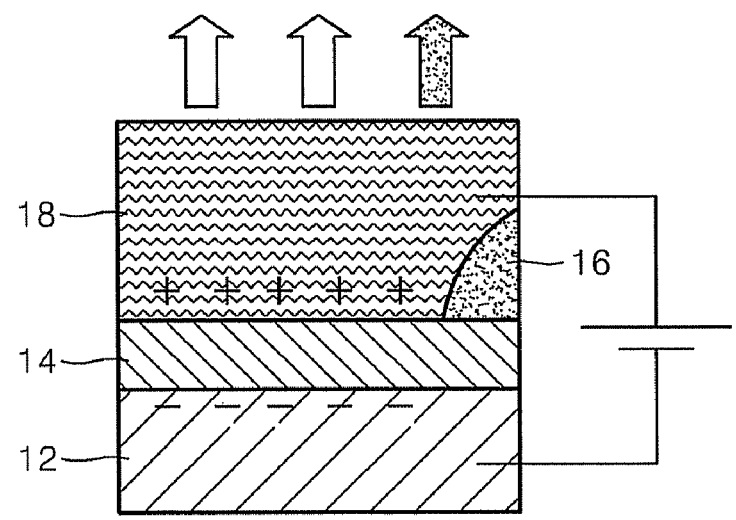

FIGS. 2A and 2B are cross-sectional diagrams of an exemplary embodiment of an optical shutter operated using an electrowetting phenomenon when voltage is not applied and when voltage is applied, respectively. The optical shutter includes an electrode 12, an insulator 14, oil 16 and water 18. The oil 16 may include, but is not limited to, a material that blocks light. In the illustrated embodiment, when a mixture of water 18 and oil 16 is placed on a hydrophobic insulator 14, the sum total of the interface energy of oil 16 and water 18 and the interface energy of oil 16 and the insulator 14 is smaller than the interface energy of water 18 and the insulator 14, and thus oil 16 covers a whole or entire surface of the insulator 14 as illustrated in FIG. 2A. In addition, the water 18 is placed on the oil 16. Accordingly, light incident through the electrode is blocked by the oil 16, as is illustrated by the shaded upward pointing arrows.

When voltage is applied between the water 18 and the insulator 14 in the optical shutter illustrated in FIG. 2A, the surface of the insulator 14 is changed from being hydrophobic into being hydrophilic. An area where water 18 connects or contacts with the insulator 14 is increased as illustrated in FIG. 2B. Light incident through the electrode 12 penetrates the water 18 and is outputted upward, as is illustrated by the unshaded upward pointing arrows.

In the illustrated embodiment, if the size of the voltage applied between the water 18 and the insulator 14 is controlled, the area where water 18 covers the insulator 14 can be controlled. Accordingly, a gray scale of light output from the optical shutter can be controlled.

Figure 2C:
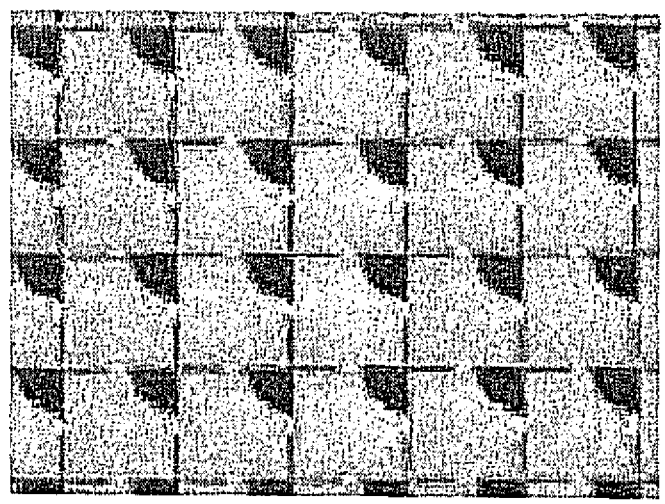
FIGS. 2C and 2D are photographic images of pixels manufactured as illustrated in FIG. 2A, illustrating that oil leans to one side of the pixels when voltage is applied to the pixels.
Figure 2D:
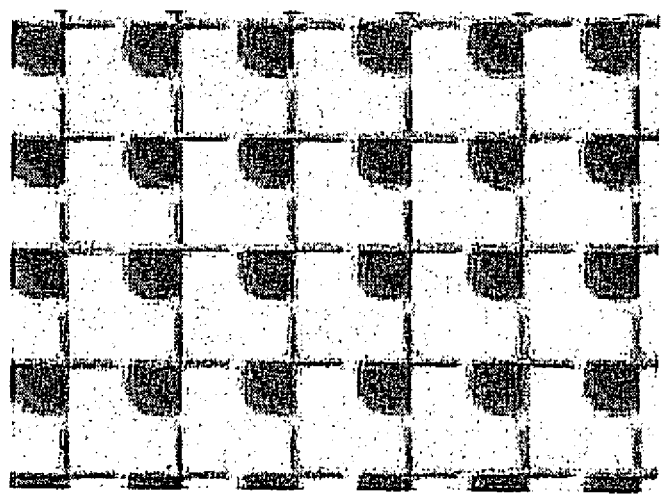

FIGS. 2C and 2D are photographic images of pixels manufactured as illustrated in FIG. 2A illustrating that oil (dark portion) leans to one side of the pixels when voltage is applied to the pixels. Referring to FIGS. 2C and 2D, the area where the oil covers the insulator is changed according to voltage applied and thus a gray scale of each pixel can be controlled.

As described above, a response speed of the optical shutter using the electrowetting phenomenon is faster than a liquid crystal speed. Referring to Applied Physics letter 86, 151121, (2005), an optical switch using the electrowetting phenomenon can realize a response speed of 10 ms in a cell having a size of 1×1 millimeters (mm). Accordingly, a response speed of approximately 1 ms is estimated in a cell having a size of 100×100 micrometers (μm). A response speed of 3 ms can be sufficiently realized in an optical shutter using the electrowetting phenomenon.

In addition, in an optical shutter in which the electrowetting phenomenon is used instead of using a liquid crystal, the switch of the optical shutter is operated by a voltage operation in which current flow hardly exists. In addition, since light is not polarized when operating the optical shutter, the optical shutter using the electrowetting phenomenon has a lower current consumption than that of the optical shutter using the liquid crystal and a viewing angle of the optical shutter using the electrowetting phenomenon is not restricted. Such advantages of the optical shutter using the electrowetting phenomenon are important in a display device which requires low current consumption and unrestricted viewing angles.

Hereinafter, the present invention will be described more fully with reference to the accompanying drawings, in which exemplary embodiments of the invention are shown.

Figure 3:
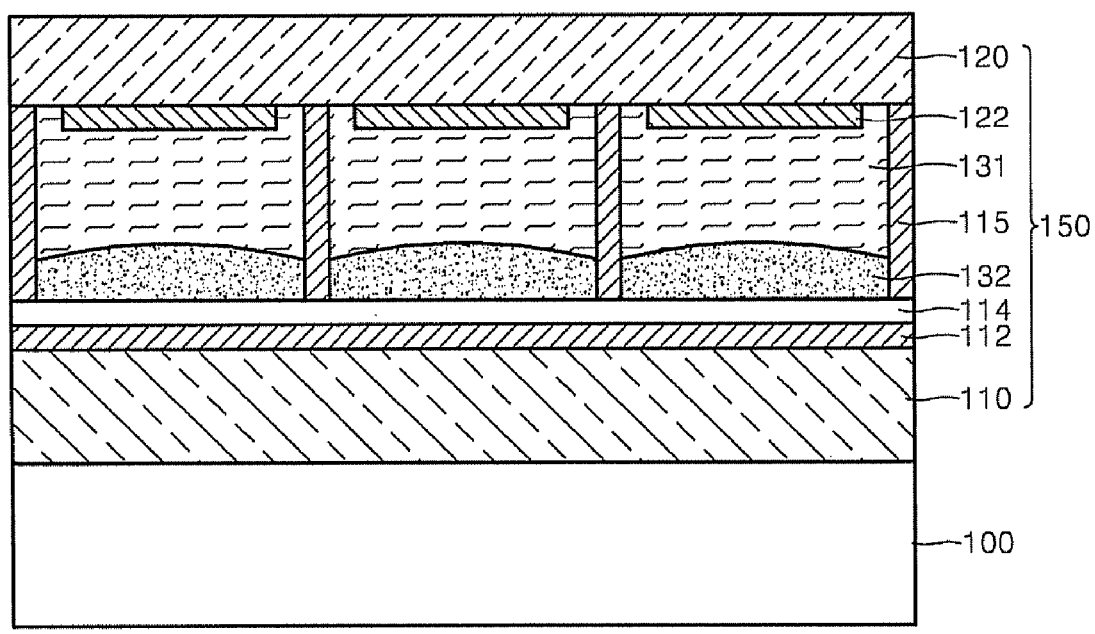
FIG. 3 is a schematic diagram of an exemplary embodiment of a display device according to the present invention.

FIG. 3 is a schematic diagram of an exemplary embodiment of a display device according to the present invention.

Referring to FIG. 3, the display device includes a backlight unit 100 and an optical shutter 150. The optical shutter 150 switches (e.g., blocks or transmits) light outputted from the backlight unit 100. In the illustrated embodiment, a field sequential light source operated by a sequential partition method is used as the backlight unit 100. The field sequential light source may include, but is not limited to, a Light Emitting Diode ("LED") or an Organic Light Emitting Diode ("OLED").

The field sequential light source outputs light of a predetermined color using a field sequential method. The display device of the illustrated embodiment realizes or displays images using an afterimage effect in which the field sequential light source is used. The field sequential light source is operated to sequentially output lights. In one exemplary embodiment, four lights are sequentially outputted in every one frame, such as red ("R")/green ("G")/blue ("B")/black, or six lights are sequentially outputted in every one frame, such as, red ("R")/black/green ("G")/ black/blue ("B")/black.

The optical shutter 150 is disposed in front of (e.g., above) the backlight unit 100, such as on the emitting side of the backlight unit 100, and switches light of the predetermined colors outputted from the backlight unit 100. In the illustrated embodiment, the optical shutter 150 switches lights of predetermined colors sequentially outputted from the field sequential light source using an electrowetting phenomenon.

The optical shutter 150 includes first and second substrates 110 and 120, a plurality of first electrodes 112, an insulator 114, a plurality of second electrodes 122, and a predetermined solution. The first and second substrates 110 and 120 are spaced apart from each other at a predetermined interval and disposed so as to face each other. The first electrodes 112 are disposed on an inner surface (e.g., an upper surface) of the first substrate 110. The insulator 114 is formed on an inside of the first substrate 110 and cover the first electrodes 112. The second electrodes 122 are formed on an inner surface (e.g., a lower surface) of the second substrate 120. The predetermined solution is filled between the second electrodes 122 and the insulator 114.

In exemplary embodiments, the first and second substrates 110 and 120 may include, but are not limited to, a glass substrate or a plastic substrate. When the first and second substrates 110 and 120 are plastic substrates, a flexible display device can be manufactured. The first and second electrodes 112 and 122 may include transparent conductive inorganic materials such as Indium Tin Oxide ("ITO") or zinc oxide ("ZnO"). The first and second electrodes 112 and 122 may be include conductive inorganic composites or organic films.

The first electrodes 112 can be substantially parallel to each other, such as, in a stripe form. The second electrodes 122 can also be substantially parallel to each other and be aligned so as to intersect the first electrodes 112, and may be orthogonal to the first electrodes 112. When the first and second electrodes 112 and 122 are arranged substantially perpendicular to each other, pixels are formed in regions where the first electrodes 112 and the second electrodes 122 intersect. The arrangement of the first and second electrodes 112 and 122 is not limited to an orthogonal arrangement and can be formed in various other patterns or arrangements. In one exemplary embodiment, the first electrodes 112 can be formed to correspond to each pixel and the second electrodes 122 can be formed in an integrated form to cover the lower part of the second substrate 120. As used herein, "correspond" may be used to indicate corresponding in shape, size or positional placement relative to another element or feature. As used herein, "integrated" is used to indicated formed to be a single unit or piece, rather than being separate or multiple elements.

In exemplary embodiments, the insulator 114 may be include a transparent material and may have a hydrophobic surface. The insulator 114 may be include organic materials and inorganic materials. The organic materials may include, but are not limited to, fluoropolymer, parylene, or the like. The inorganic materials may include, but are not limited to, silicon dioxide ($SiO_2$), Barium Strontium Titanate (BST), or the like.

When the insulator 114 includes inorganic materials, such as $SiO_2$ or BST, the insulator 114 is coated with organic materials such as fluoropolymer and parylene first, in order to provide a large enough hydrophobic property to the surface of the insulator 114. In the illustrated embodiment, the insulator 114 should be hydrophobic. In order to cause or support the electrowetting phenomenon, the dielectric constant of the insulator 114 may be increased as the insulator 114 gets thinner, according to the Lippman equation described above. When the insulator 114 is includes organic materials, such as fluoropolymer or parylene, a hydrophobic property is sufficient but breakdown voltage is low. In addition, when the insulator 114 includes inorganic materials, materials having a high dielectric constant can be used and breakdown voltage is high. However, since the surface of the insulator 114 is not hydrophobic, the insulator 114 should be coated with hydrophobic polymer or hydrophobically treated.

The solution includes a transparent aqueous solution 131 and an opaque organic solution 132. In exemplary embodiments, distilled water or an aqueous solution in which an electrolyte is dissolved can be used as the aqueous solution 131. The organic solution 132 may be hydrophobic to cause the electrowetting phenomenon.

In an exemplary embodiment, the organic solution 132 may block red, green, and blue light generated by the backlight unit 100 and thus may include inorganic or organic materials which can block such light. In one exemplary embodiment, the organic solution 132 may include the inorganic materials such as, carbon black and the organic materials such as, organic dye and organic pigment, whereby the inorganic materials and organic materials block red, green, and blue light. The organic solution 132 may also include materials used in a color filter of an LCD. The organic solution 132 may include black oil. The black oil may include black ink containing carbon black.

Referring again to FIG. 3, a plurality of partition walls 115 are interposed between the first substrate 110 and the second substrate 120 and extend substantially perpendicular to the first and second substrate 110 and 120. The partition walls 115 support the first substrate 110 and the second substrate 120 at regular intervals. Alternatively, the partition walls 115 may be disposed at non-uniform distances across the first and second substrates 110 and 120 as is suitable for the purposes described herein. In addition, the space between the first substrate 110 and the second substrate 120 may be partitioned using the partition walls 115 to have a plurality of pixels formed therein. In an exemplary embodiment, each of the pixels may be formed to have a size (e.g., a length and width when viewed in a plan view) of about 300 µm or below.

In the optical shutter 150 of the illustrated embodiment, when a fixed voltage is applied between the first electrode 112 and the second electrode 122, the insulator 114 having a hydrophobic surface is changed into a hydrophilic insulator, and thus the area where the aqueous solution 131 connects with the insulator 114 is increased. The organic solution 132 relatively rapidly moves to a region of the first and second substrates 110 and 120 where voltage is not applied.

As in the illustrated embodiment in FIG. 3, the optical shutter 150 using the electrowetting phenomenon is used to switch light of a predetermined color outputted from the backlight unit 100. The optical shutter 150 using the electrowetting phenomenon has a relatively faster response speed than that of liquid crystal. In an exemplary embodiment, a speed at which the organic solution 132 moves (e.g., a moving speed), which determines the overall response speed of the optical shutter 150, may be approximately 0.1 to 5 centimeters per second (cm/sec).

In one illustrated embodiment of the display device in which a size of the pixel is about 100 µm, when the moving speed of the organic solution 132 is 2.5 cm/sec, the response speed of the optical shutter 150 can be approximately 4 ms.

Figure 4A:
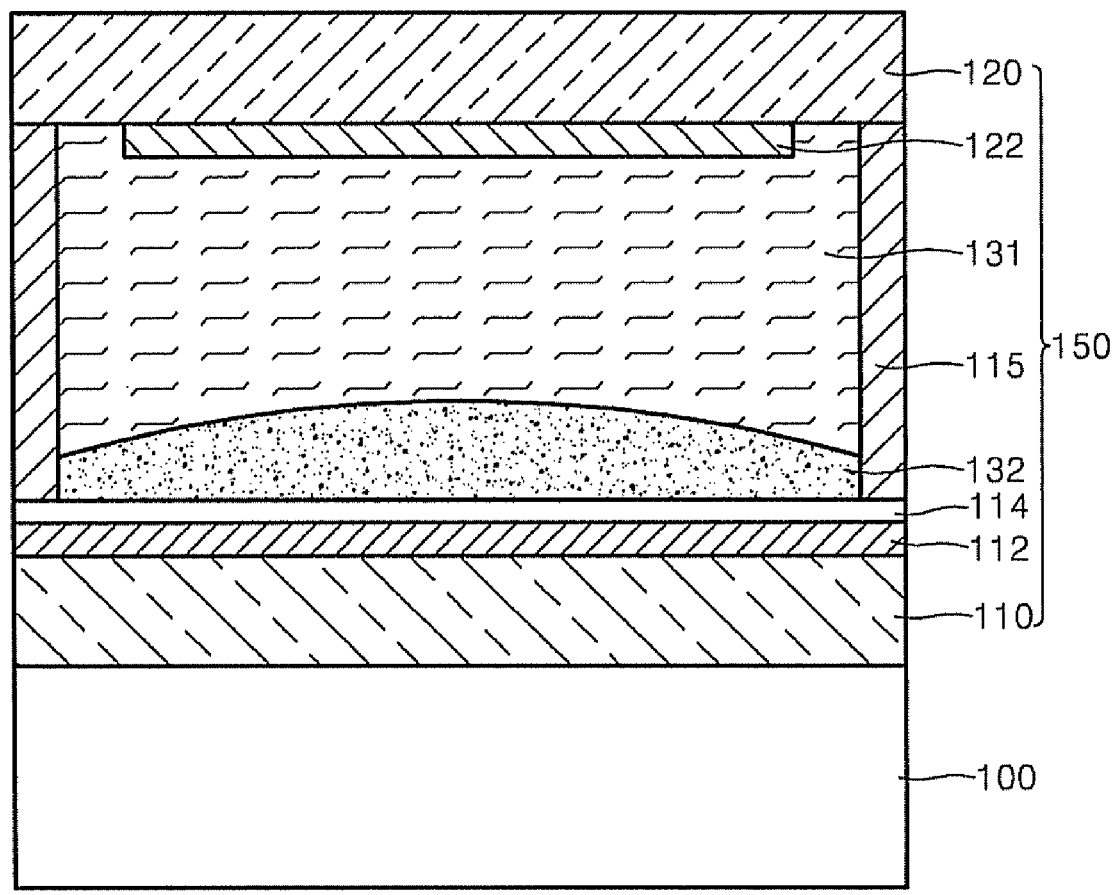
FIGS. 4A and 4B are diagrams for illustrating an exemplary embodiment of operation of an optical shutter in a display device according to the present invention.
Figure 4B:
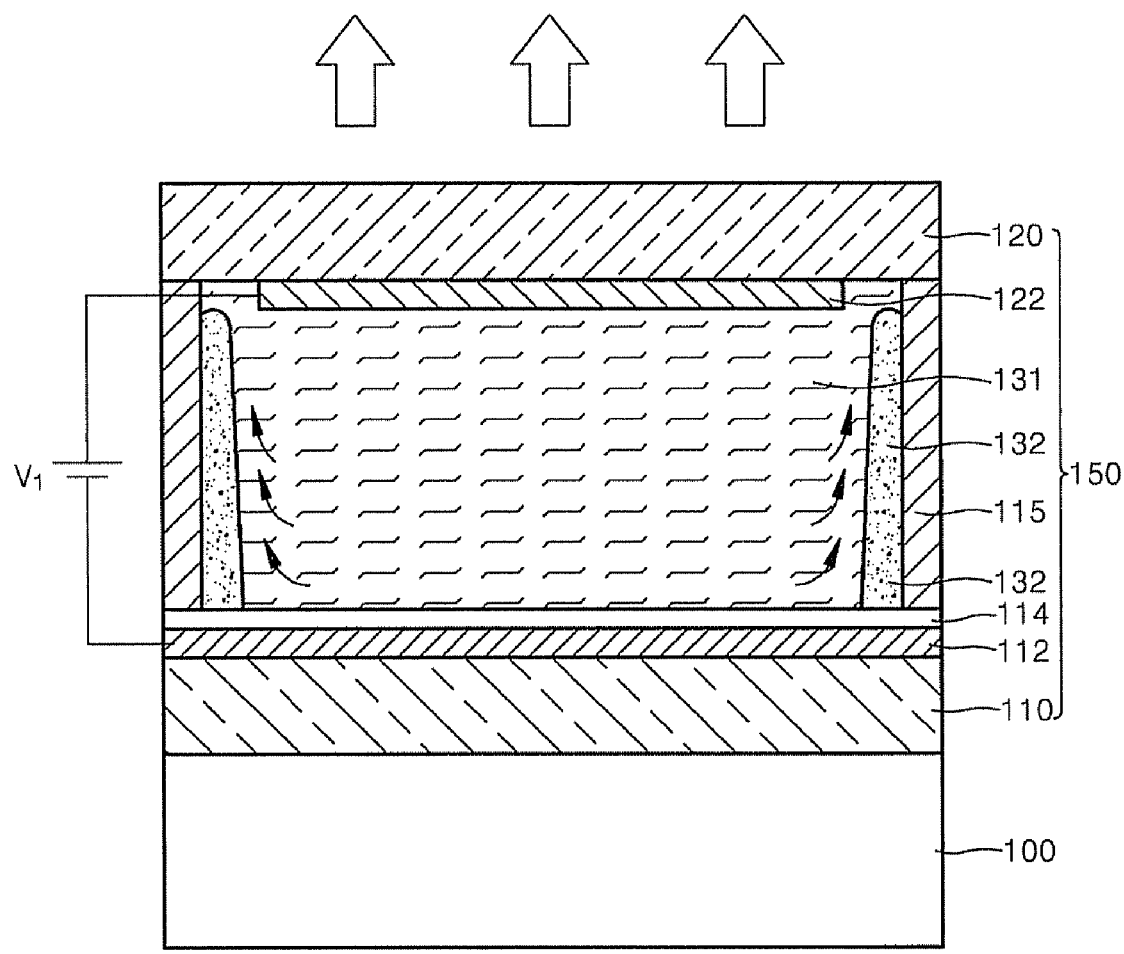

FIGS. 4A and 4B are diagrams for illustrating an exemplary embodiment of operation of the optical shutter 150 in the display device according to the present invention. FIG. 4A illustrates the display device when voltage is not applied between the first electrodes 112 and the second electrodes 122. FIG. 4B illustrates the display device when a fixed voltage ($V_1$) is applied between the first electrodes 112 and the second electrodes 122.

Referring to FIG. 4A, when voltage is not applied between the first electrodes 112 and the second electrodes 122, the sum total of the interface energy of the organic solution 132 and the aqueous solution 131, and the interface energy of the organic solution 132 and the insulator 114 is smaller than the interface energy of the aqueous solution 131 and the insulator 114, and thus, the organic solution 132 covers the whole insulator 114. As in the illustrated embodiment, the aqueous solution 131 is disposed above the organic solution 132. Accordingly, light outputted from the backlight unit 100 is blocked by the organic solution 132 and thus cannot penetrate pixels.

Referring to FIG. 4B, when a fixed voltage, e.g. ($V_1$), is applied between the first electrodes 112 and the second electrodes 122, a contact property between the insulator 114 having a hydrophobic surface and the organic solution 132 is changed. More specifically, the insulator 114 having a hydrophobic surface is changed into a hydrophilic insulator thereby increasing an area where the aqueous solution 131 contacts with the insulator 114.

The organic solution 132 relatively rapidly moves to a region of the space between the first electrode 110, the second electrode 120 and the walls 115, where voltage is not applied, such as around or toward the partition walls 115, as illustrated by the dark arrows. Subsequently, the light of the predetermined color outputted from the backlight unit 100 penetrates the transparent aqueous solution 131 in the pixels, e.g., where the organic solution is not disposed, and is transmitted out of the display device as illustrated by the unshaded upward facing arrows above the display device.

Figure 5:
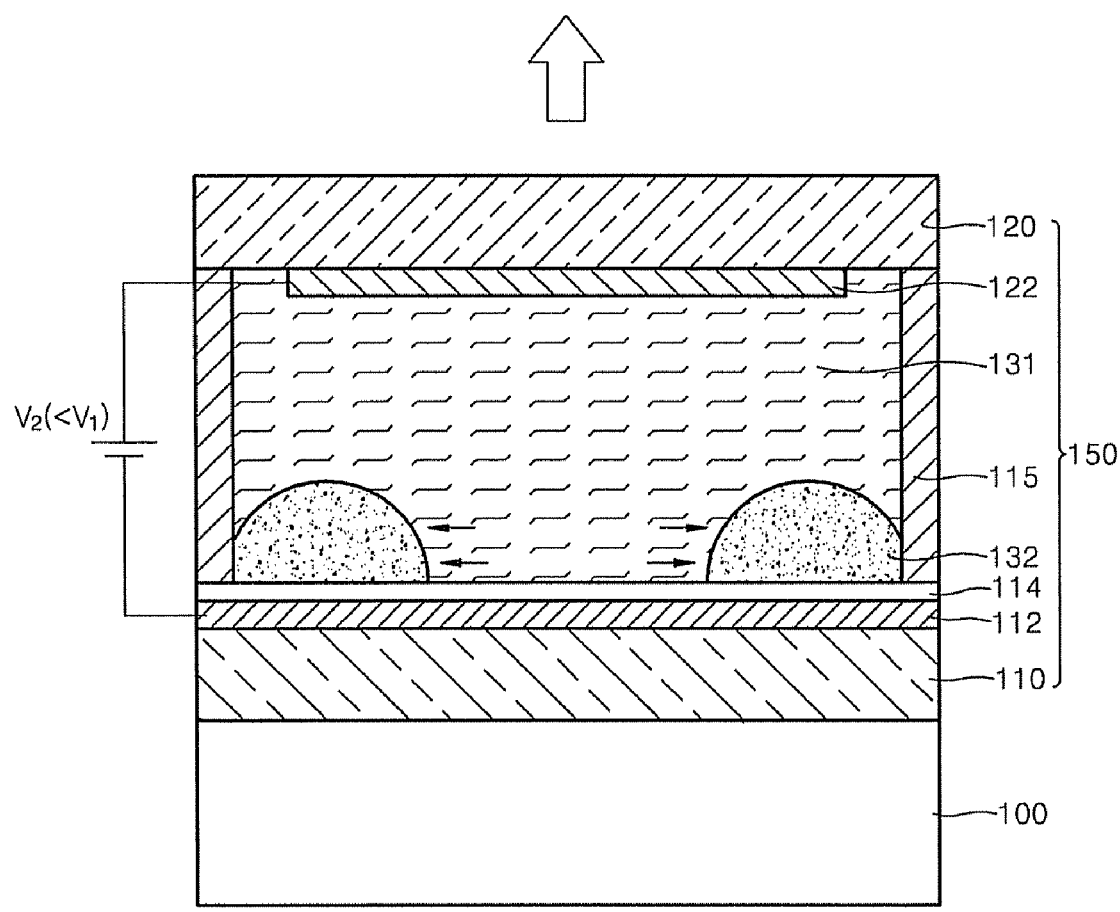
FIG. 5 illustrates an exemplary embodiment where an area through which light penetrates is controlled by controlling the magnitude of a voltage applied between electrodes in a display device according to the present invention.

In an exemplary embodiment of the display device, a size or amount of voltage applied between the first electrodes 112 and the second electrodes 122 may be controlled, such as illustrated in FIG. 5, and thus a gray scale of each pixel can be controlled.

Referring to FIG. 5, when a voltage smaller than the voltage ($V_1$) described above, e.g., $V_2$ ($<V_1$), is applied between the first electrodes 112 and the second electrodes 122, the organic solution 132 moves to cover a portion of the insulator 114 in the pixels. In the embodiment of FIG. 5, the portion of the insulator 114 covered in the pixels is larger than the portion of the insulator 114 covered in FIG. 4B. As illustrated in FIG. 5, the light outputted from the backlight unit 100 penetrates the insulator 114 uncovered by the organic solution 132 and is transmitted out of the display device, as indicated by the unshaded upward arrow.

As in the illustrated embodiments, when the size of voltage applied between the first electrodes 112 and the second electrodes 122 is controlled, the area where the insulator 114 is covered by the organic solution 132 can be controlled and an amount of light that penetrates through each pixel can be ultimately controlled so as to control a gray scale of each pixel.

Figure 6:
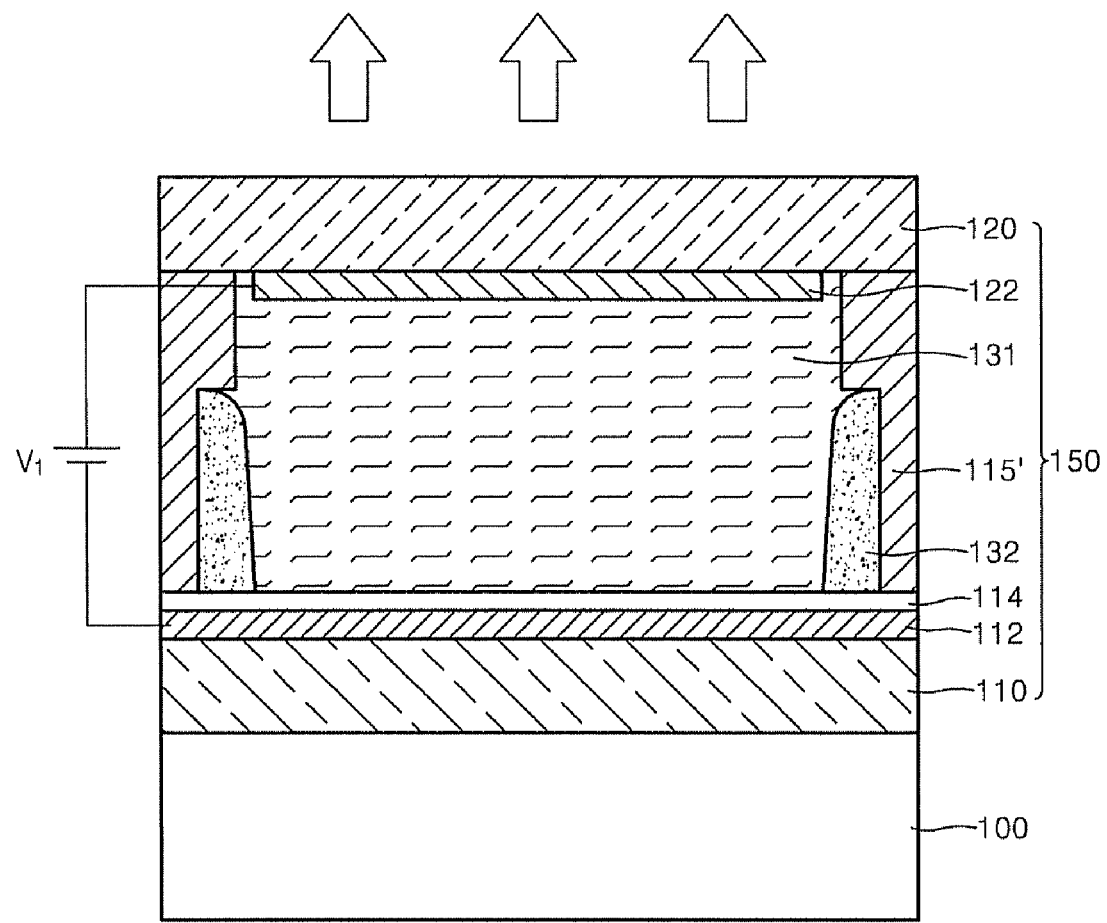
FIG. 6 illustrates an exemplary embodiment of a transformational partition wall which can be used in a display device according to the present invention.

FIG. 6 illustrates an exemplary embodiment of a transformational partition wall 115' which can be used in the display device according to the present invention. Referring to FIG. 6, a lower part of the partition walls 115' is thinner (e.g., in a direction parallel to the first and second substrates 110 and 120) than an upper part of the partition walls 115'. When the lower part of the partition walls 115' is formed thinner than the upper part, the opaque organic solution 132 can move and be held in a recessed portion of the lower part of the partition walls 115'. The region where light is transmitted through the pixels, e.g., where the organic solution 132 does not cover the insulator 113, can be increased.

Figure 7:
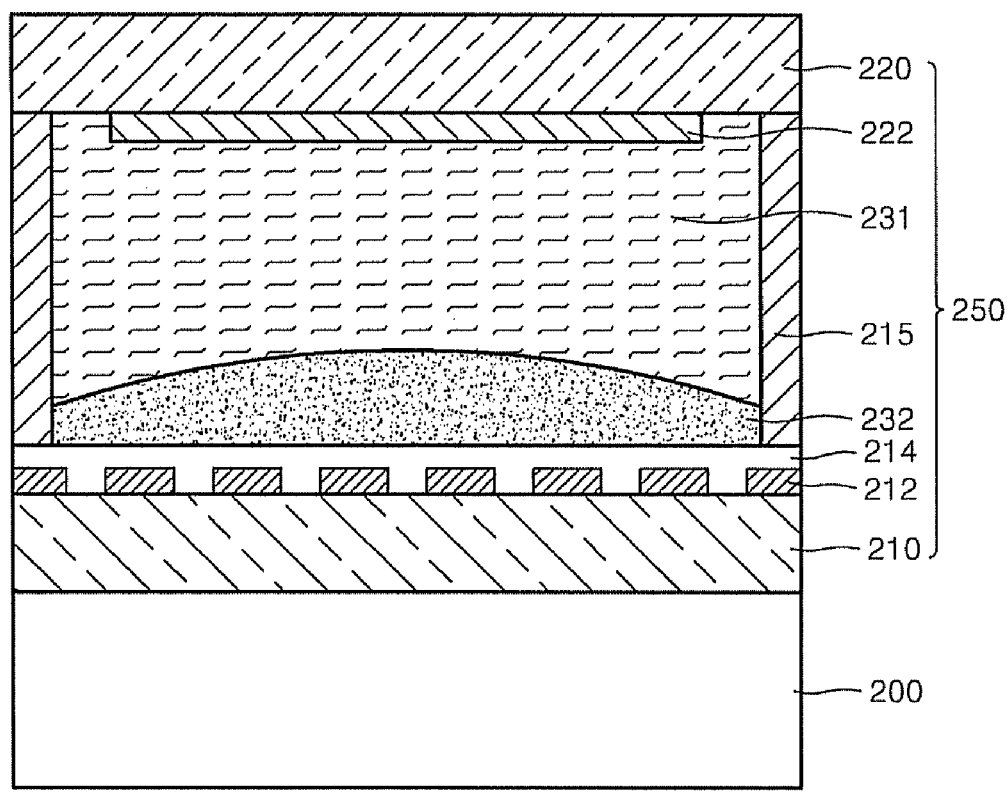
FIG. 7 is a schematic diagram of another exemplary embodiment of a display device according to the present invention.

FIG. 7 is a schematic diagram of another exemplary embodiment of a display device according to the present invention. Differences between the display device in FIGS. 3-6 and in FIG. 7 will be described.

Referring to FIG. 7, the display device includes a backlight unit 200 and an optical shutter 250. The optical shutter 250 switches light outputted from the backlight unit 200. In the illustrated embodiment, a field sequential light source operated by a sequential partition method is used as the backlight unit 200.

The optical shutter 250 is disposed in front of (e.g., above) the backlight unit 200 and switches (e.g., on or off) the light of the predetermined colors outputted from the backlight unit 200. In the illustrated embodiment, the optical shutter 250 switches lights of predetermined colors sequentially outputted from the field sequential light source using the electrowetting phenomenon as described above.

The optical shutter 250 includes first and second substrates 210 and 220, a plurality of first electrodes 212, an insulator 214, a second electrode 222, and a predetermined solution. The first and second substrates 210 and 220 are spaced apart from each other at a predetermined interval and disposed so as to face each other. The first electrodes 212 are disposed on an inner surface of the first substrate 210, the insulator 214 is formed on an inside of the first substrate 210 and covers the first electrodes 212, the second electrode 222 is formed on an inner surface of the second substrate 220, and the solution is filled between the second electrode 222 and the insulator 214.

In exemplary embodiments, the first and second substrates 210 and 220 may include, but are not limited to, a glass substrate or a plastic substrate. In the illustrated embodiment, a plurality of first electrodes 212 is formed corresponding to one pixel. Switching elements (not shown) are connected to each first electrode to switch an applied voltage. The first electrodes 212 may be formed in any of a number of shapes or arrangements, such as, in a stripe form or a dot form. However, the first electrodes 212 are not limited thereto and can be formed in various other forms as is suitable for the purposes described herein.

The second electrode 222 may be formed in any of a number of shapes or arrangements, such as, in a stripe form or an integrated form to cover a lower part or lower surface of the second substrate 220. However, the second electrode 222 are not limited thereto and can be formed in various other forms as is suitable for the purposes described herein.

In exemplary embodiments, the first and second electrodes 212 and 222 can include transparent conductive materials. The insulator 214 may include a transparent material and may have a hydrophobic surface as described above.

Referring again to FIG. 7, the solution includes a transparent aqueous solution 231 and an opaque organic solution 232. A plurality of partition walls 215 are interposed between the first substrate 210 and the second substrate 220 and extend substantially perpendicular to the first and second substrates 210 and 220. The partition walls 215 may have a substantially uniform thickness along a longitudinal direction extending between the first and second substrates 210 and 220. Alternatively, a lower part of partition walls 215 may be thinner than an upper part, such as is illustrated in FIG. 6.

Hereinafter, another exemplary embodiment of operation of an optical shutter in a display device according to the present invention will be described.

Figure 8A:
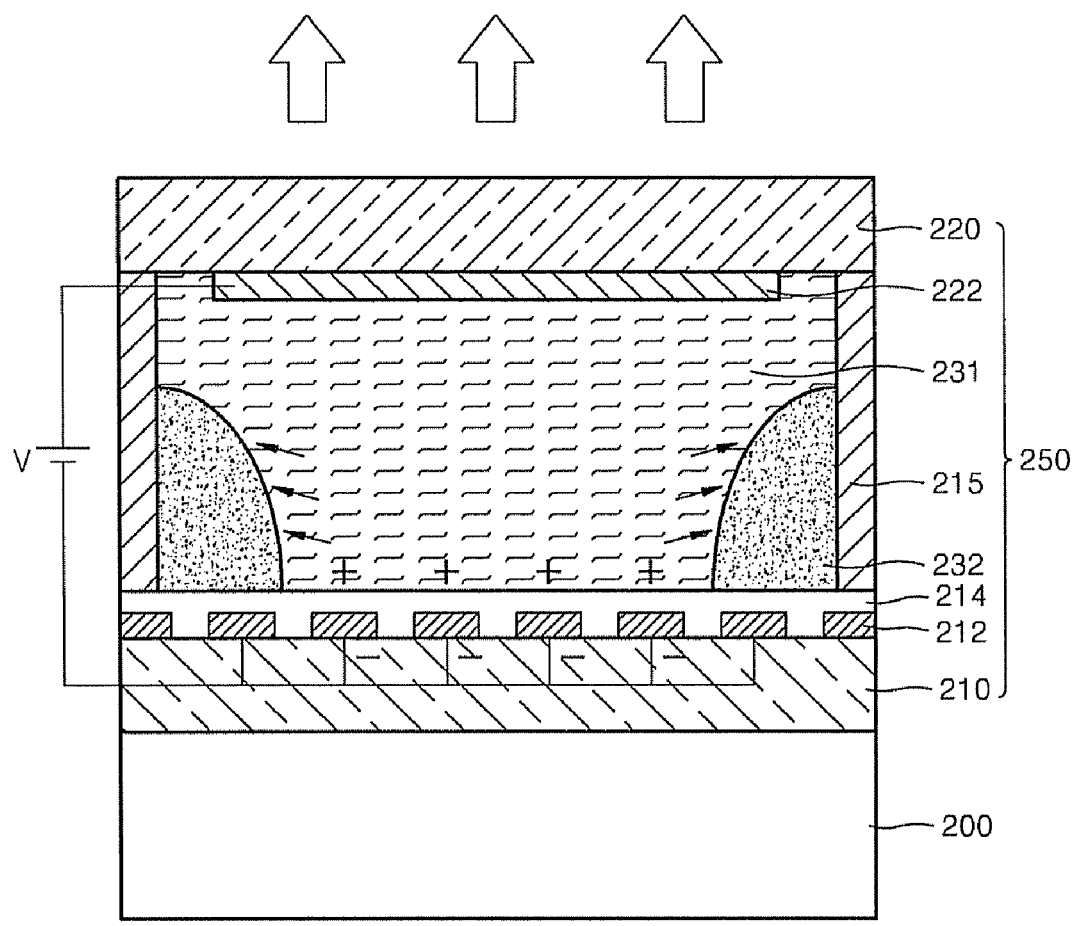
FIGS. 8A and 8B are diagrams for illustrating another exemplary embodiment of operation of an optical shutter in a display device according to the present invention.
Figure 8B:
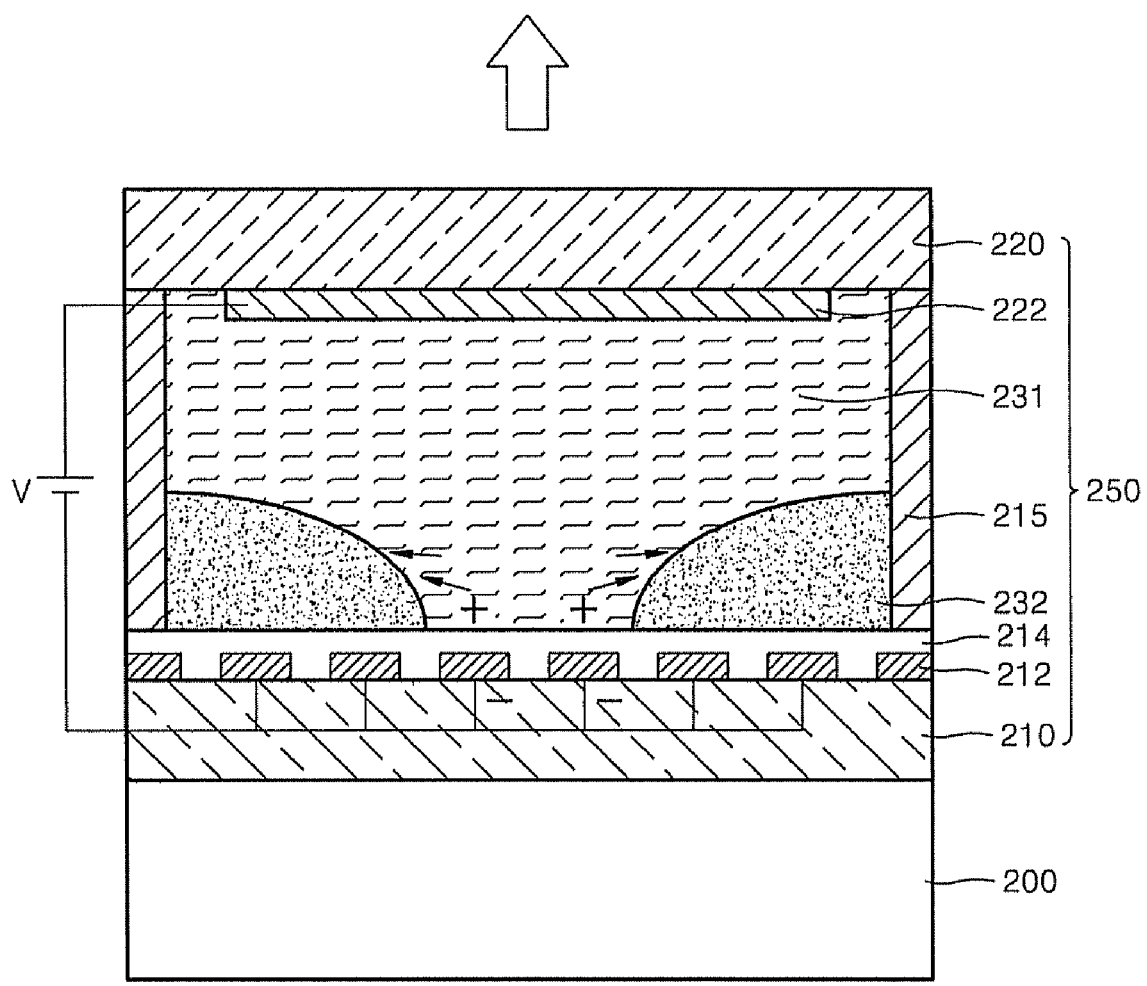

FIG. 7 illustrates the display device voltage is not applied between the first electrodes 212 and the second electrode 222. FIGS. 8A and 8B are diagrams illustrating the operation of the optical shutter 250 in the display device when a fixed voltage is applied between the first electrodes 212 and the second electrode 222.

Referring to FIG. 7, when a voltage is not applied between the first electrodes 212 and the second electrode 222, the organic solution 232 covers substantially an entire or a whole the insulator 214. The aqueous solution 231 is disposed above the organic solution 232. Accordingly, light outputted from the backlight unit 200 is blocked by the organic solution 232 and thus cannot penetrate the pixel.

Referring to FIG. 8A, a fixed voltage, e.g., (V), is applied between the first electrodes 212 and the second electrode 222. A plurality of the first electrodes 212 constitutes one pixel. When the first electrodes 212 is controlled and a voltage is applied to the first electrodes 212, such as to four first electrodes 212 disposed at a center portion of the pixel as illustrated in FIG. 8A ("+"),the organic solution 232 moves to a region of the pixel where voltage is not applied, such as adjacent to the partitioned walls 215. Controlling the first electrodes 212 may be accomplished by switching the voltage applied to each of the first electrodes 212. Since the organic solution 232 moves so as to uncover a majority of the insulator 214, most of the light outputted from the backlight unit 200 penetrates the pixel and is transmitted out of the display device, as is illustrated by the unshaded upward arrows.

When the voltage (V) is applied to a lesser number of first electrodes 212 than in FIG. 8A, such as two first electrodes 212 disposed at the center of the pixel as illustrated in FIG. 8B, the organic solution 232 moves to a region of the pixel where voltage is not applied. Since the area where the organic solution 232 covers the insulator 214 in FIG. 8B is larger than the area where the organic solution 232 covers the insulator 214 in FIG. 8A, the amount of light outputted from the backlight unit 200 that penetrates the pixel is less than that of FIG. 8A, as illustrated by the single unshaded upward arrow.

In the illustrated embodiment, as the first electrodes 212 corresponding to one pixel are, the area where the insulator 214 is covered by the organic solution 232 can be adjusted. Accordingly, an amount of light that penetrates through the insulator 214 and ultimately through each pixel can be controlled so as to control a gray scale of each pixel.

As in the illustrated embodiment, when a plurality of first electrodes 212 are formed to correspond to one pixel and are controlled individually, a desired amount of the organic solution 232 can be easily moved to a desired region. Advantageously, a gray scale of each pixel can be realized easier than that of previous embodiment and a response speed of the optical shutter 250 can be increased in the current embodiment.

Hereinafter, an exemplary embodiment of a process of realizing (e.g., displaying) images using the display device according to the present invention will be described. In the exemplary embodiment, when the display device forms 60 frames in one second, one frame constituting four sub frames (e.g., R/G/B/Black) operated sequentially, will be described.

Figure 9:
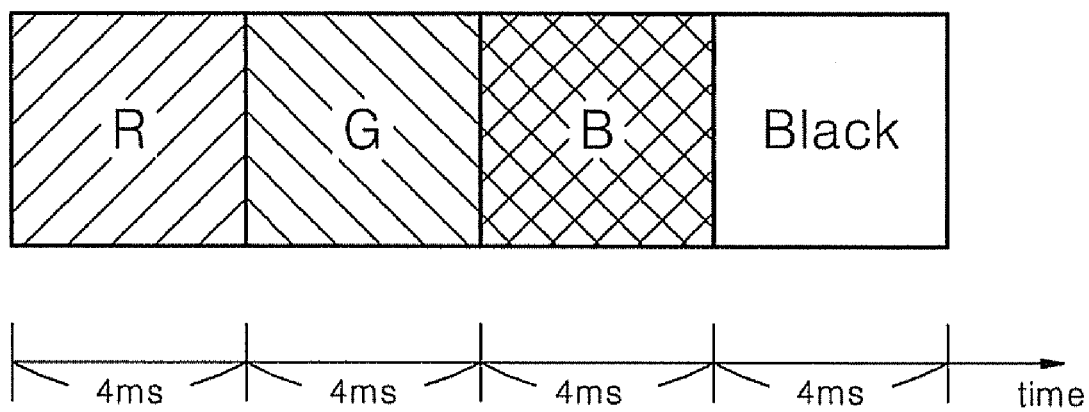
FIG. 9 illustrates an exemplary embodiment of lights of predetermined colors outputted sequentially from a field sequential light source according to the present invention.

FIG. 9 illustrates an exemplary embodiment of lights of predetermined colors outputted sequentially from a field sequential light source. The field sequential light source may be used as a backlight unit, such as in the illustrated embodiments according to the present invention. Referring to FIG. 9, the field sequential LED outputs red ("R")/green ("G")/blue ("B")/black lights sequentially per frame. Each color of light is outputted for 4 ms.

Figure 10A:
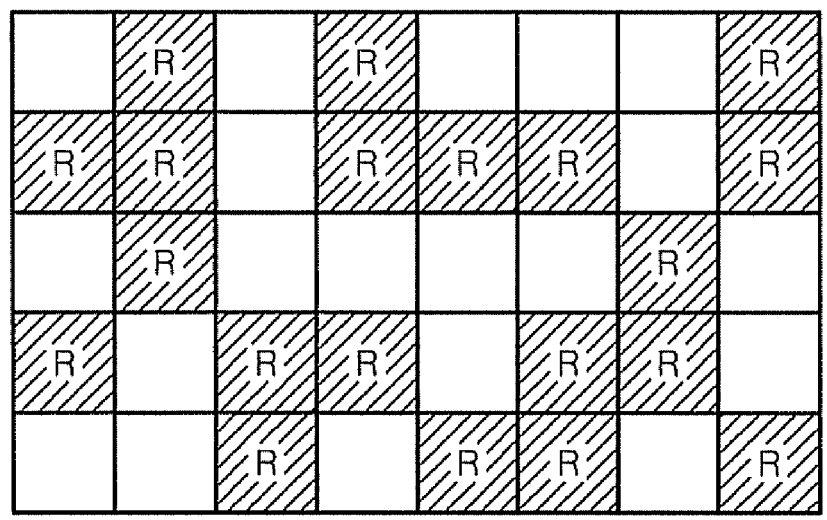
FIGS. 10A through 10D sequentially illustrate an exemplary embodiment of a process of realizing images using a display device according to the present invention, when light of predetermined colors is outputted from a backlight unit as illustrated in FIG. 9.

FIGS. 10A through 10D sequentially illustrate an exemplary embodiment of a process of realizing images using a display device, such as in the exemplary embodiments of the present invention, and lights of predetermined colors are outputted from the backlight unit as illustrated in FIG. 9. Referring to FIGS. 10A through 10D, red light ("R") is firstly outputted for 4 ms from the backlight unit. The red light ("R") penetrates fixed pixels due to the operation of the optical shutter using the electrowetting phenomenon for 4 ms (FIG. 10A).

Figure 10B:
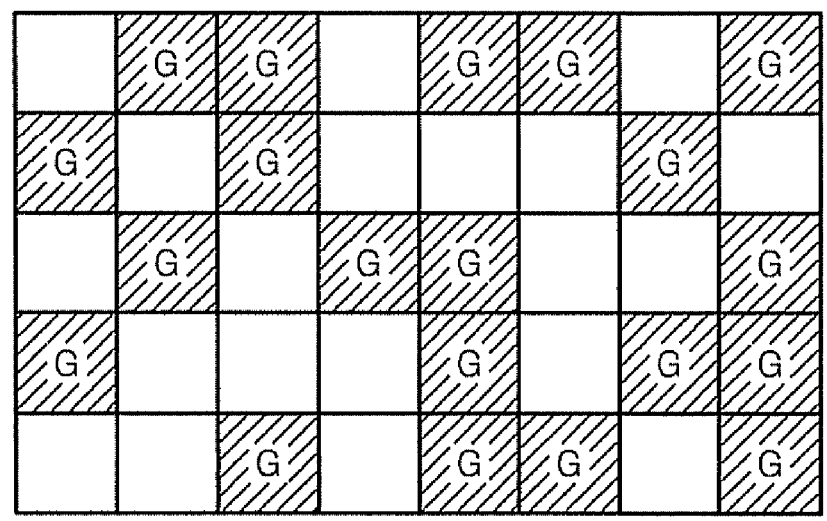

Then, green light ("G") is outputted for 4 ms from the backlight unit. The green light ("G") penetrates fixed pixels selected by the operation of the optical shutter using the electrowetting phenomenon for 4 ms (FIG. 10B).

Figure 10C:
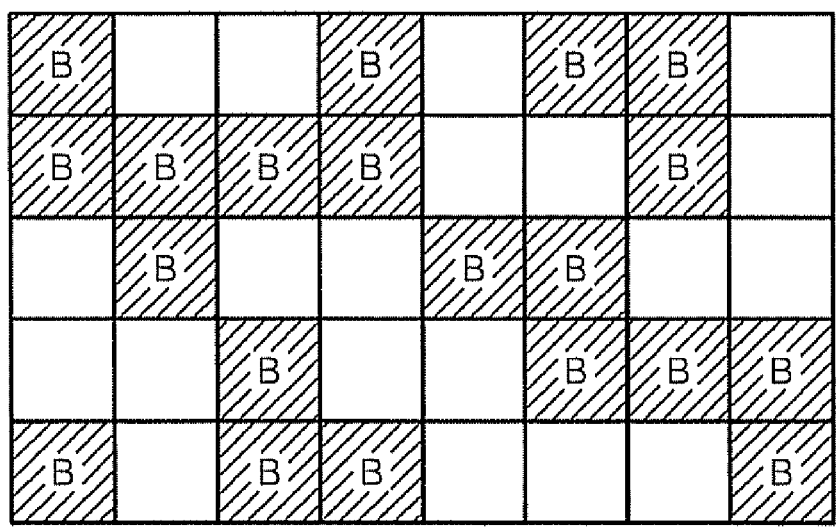

Next, blue light ("B") is outputted from the backlight unit. The blue light ("B") penetrates fixed pixels selected by the operation of the optical shutter using the electrowetting phenomenon for 4 ms (FIG. 10C).

Figure 10D:
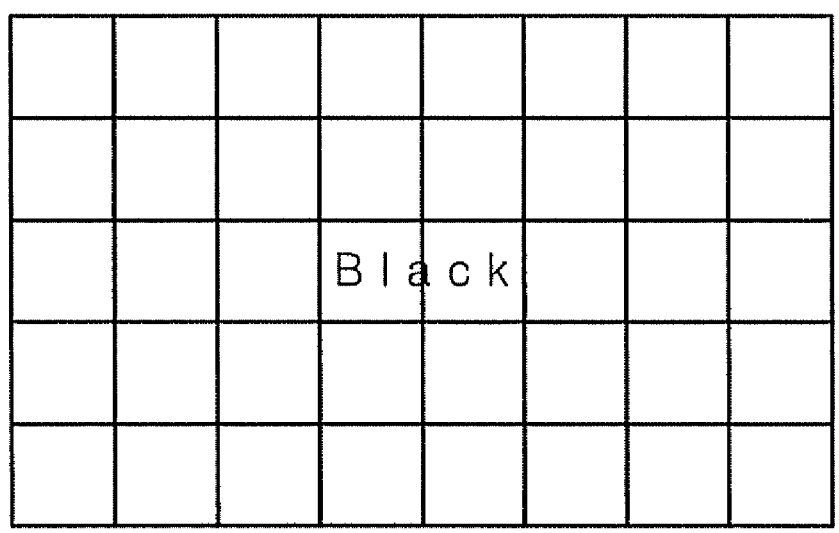

Finally, operation of the backlight unit is stopped or cut off and black light is outputted from all pixels for 4 ms (FIG. 10D). In the illustrated embodiment, when red ("R")/green ("G")/blue ("B")/black lights sequentially penetrate the selected pixels for 4 ms, images are realized by an afterimage effect.

In the illustrated exemplary embodiments, a field sequential light source operated by a sequential partition method is used as backlight unit. Lights sequentially outputted from the backlight unit are controlled or switched with the optical shutter using the electrowetting phenomenon. The optical shutter has a relatively fast response speed. Thus, desired images can be realized.

As in the illustrated exemplary embodiments, since the display device does not need a color filter, light loss is significantly decreased compared to that of display devices including the color filter. Advantageously, the display device can operate with lower power and have essentially unrestricted viewing angles. Also, time and cost required for manufacturing the display device are reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
   a backlight unit comprising a field sequential light source operated using a sequential partition method; and
   an optical shutter using an electrowetting phenomenon, the optical shutter disposed on a light emitting side of the backlight unit and switching light outputted from the backlight unit;
   wherein the optical shutter comprises:
   a first and a second substrate spaced apart from each other at a predetermined interval and disposed facing each other;
   a plurality of first electrodes disposed on an inner surface of the first substrate;
   an insulator disposed on the first substrate and covering the first electrodes;
   a plurality of second electrodes disposed on an inner surface of the second substrate;
   a plurality of pixels disposed at intersections of the first electrodes and the second electrodes; and
   a transparent aqueous solution and an opaque organic solution disposed between the second electrodes and the insulator.

2. The display device of claim 1, wherein the optical shutter switches light of a predetermined color outputted from the backlight unit for each pixel, and
   wherein the organic solution moves when a voltage is applied between the first electrodes and the second electrodes.

3. The display device of claim 2, wherein the voltage applied between the first electrodes and the second electrodes is controlled and controls a grey scale of each pixel.

4. The display device of claim 2, wherein the plurality of first electrodes correspond to one pixel.

5. The display device of claim 4, wherein a switching voltage to each of the first electrodes is controlled and controls a gray scale of each pixel.

6. The display device of claim 2, wherein each of the pixels has a size of 300 μm or below.

7. The display device of claim 1, further comprising a plurality of partition walls interposed between the first substrate and the second substrate, partitioning a space between the first substrate and the second substrate and forming the plurality of pixels.

8. The display device of claim 7, wherein a lower part of the partition walls is thinner than an upper part of the partition walls and the organic solution moves into the lower part of the partition walls when a voltage is applied between the first electrodes and the second electrodes.

9. The display device of claim 1, wherein the first and second substrates are transparent substrates.

10. The display device of claim 1, wherein the first electrodes are parallel to each other.

11. The display device of claim 10, wherein the second electrodes are parallel to each other and intersect the first electrodes.

12. The display device of claim 1, wherein the first and second electrodes include transparent conductive materials.

13. The display device of claim 12, wherein the first and second electrodes include Indium Tin Oxide ("ITO") or zinc oxide ("ZnO").

14. The display device of claim 1, wherein the insulator includes a hydrophobic surface.

15. The display device of claim 1, wherein the organic solution moves at a speed of about 0.1 to 5 centimeters per second (cm/sec) when a voltage is applied between the first electrodes and the second electrodes.

16. The display device of claim 1, wherein the organic solution includes black oil.

17. The display device of claim 16, wherein the black oil includes black ink.

18. The display device of claim 17, wherein the black ink includes carbon black.

19. The display device of claim 1, wherein the field sequential light source outputs red ("R")/green ("G")/blue ("B")/black lights sequentially per one frame.

20. The display device of claim 1, wherein the field sequential light source outputs red ("R")/black/green ("G")/black/blue ("B")/black lights sequentially per one frame.

21. A method of controlling a display device, the method comprising:

operating an optical shutter using an electrowetting phenomenon, the optical shutter being disposed on a light emitting side of a backlight unit and comprising:
  a first and a second substrate spaced apart from each other at a predetermined interval and disposed facing each other;
  a plurality of first electrodes disposed on an inner surface of the first substrate;
  an insulator disposed on the first substrate and covering the first electrodes;
  a plurality of second electrodes disposed on an inner surface of the second substrate;
  a plurality of pixels disposed at intersections of the first electrodes and the second electrodes; and
  a transparent aqueous solution and an opaque organic solution disposed between the second electrodes and the insulator; and
switching light of a predetermined color outputted from the backlight unit for each of the plurality of pixels.

22. The method of claim 21, wherein the controlling an optical shutter comprises:
  applying a voltage between the first electrodes and the second electrodes; and
  moving the organic solution and increasing a contact area between the transparent aqueous solution and the insulator, the predetermined color being outputted through the contact area.

23. The method of claim 22, wherein the plurality of first electrodes corresponds to one pixel.

24. The method of claim 22, wherein the applying a voltage between the first electrodes and the second electrodes includes controlling a switching voltage to each of the first electrodes.

25. The method of claim 22, wherein the optical shutter further comprises a plurality of partition walls interposed between the first substrate and the second substrate and partitioning a space between the first substrate and the second substrate into pixel regions.

26. The method of claim 22, wherein the optical shutter further comprises a plurality of partition walls interposed between the first substrate and the second substrate, the partition walls forming pixel regions, and wherein facing partition walls within a pixel region include facing recesses, respectively, the recesses disposed at a lower part of the facing partition walls, the organic solution moving into the lower part of each of the partition walls.

* * * * *